United States Patent
Ohashi et al.

(10) Patent No.: US 11,108,969 B2
(45) Date of Patent: Aug. 31, 2021

(54) SHUTTER APPARATUS, IMAGING APPARATUS, CONTROL METHOD OF SHUTTER APPARATUS, AND STORAGE MEDIUM

(71) Applicant: CANON KABUSHIKI KAISHA, Tokyo (JP)

(72) Inventors: Kaishi Ohashi, Tokyo (JP); Jumpei Ishibiki, Yashio (JP); Masanori Sakai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 16/680,860

(22) Filed: Nov. 12, 2019

(65) Prior Publication Data
US 2020/0162654 A1     May 21, 2020

(30) Foreign Application Priority Data
Nov. 15, 2018  (JP) .............................. JP2018-214629

(51) Int. Cl.
H04N 5/235     (2006.01)
G03B 7/22      (2021.01)

(52) U.S. Cl.
CPC ............. *H04N 5/2353* (2013.01); *G03B 7/22* (2013.01)

(58) Field of Classification Search
None
See application file for complete search history.

(56) References Cited

U.S. PATENT DOCUMENTS

2014/0016023 A1*  1/2014  Min .................. G03B 9/42
                                                       348/362

FOREIGN PATENT DOCUMENTS

JP        2017-126917 A      7/2017

* cited by examiner

*Primary Examiner* — Mark T Monk
(74) *Attorney, Agent, or Firm* — Cowan, Liebowitz & Latman, P.C.

(57) ABSTRACT

A shutter apparatus includes a shutter base plate having an opening, a light shielding member movable to provide a closed state for closing the opening and an open state for opening the opening, and at least one processor or circuit configured to perform operations of a control unit configured to control the light shielding member configured to reciprocate relative to the opening so as to move the light shielding member in a first direction for a forward exposure and in a second direction opposite to the first direction for a return exposure. The control unit varies an exposure correction amount of the light shielding member between the forward exposure and the return exposure.

15 Claims, 11 Drawing Sheets

SHUTTER APPARATUS, IMAGING APPARATUS, CONTROL METHOD OF SHUTTER APPARATUS, AND STORAGE MEDIUM

BACKGROUND OF THE INVENTION

Field of the Invention

The present invention relates to a shutter apparatus configured to provide a reciprocating exposure operation.

Description of the Related Art

One conventional shutter apparatus includes a light shielding member (blade unit) that can provide a reciprocating exposure operation. For example, Japanese Patent Application Laid-Open No. ("JP") 2017-126917 discloses an imaging apparatus that corrects moving start timings of two blade units in order to obtain a proper or correct exposure amount in both forward and return exposures, according to a difference or change in the moving characteristics of the light shielding member due to abrasions or the like during the forward exposure and the return exposure.

Since the imaging apparatus disclosed in JP 2017-126917 does not consider a positional relationship between a pupil position and the light shielding member in the optical system, a proper exposure amount cannot be acquired in both the forward exposure and the return exposure.

SUMMARY OF THE INVENTION

The present invention provides a shutter apparatus that can provide a proper exposure amount in each of a forward exposure and a return exposure.

A shutter apparatus according to one aspect of the present invention includes a shutter base plate having an opening, a light shielding member movable to provide a closed state for closing the opening and an open state for opening the opening, and at least one processor or circuit configured to perform operations of a control unit configured to control the light shielding member configured to reciprocate relative to the opening so as to move the light shielding member in a first direction for a forward exposure and in a second direction opposite to the first direction for a return exposure. The control unit varies an exposure correction amount of the light shielding member between the forward exposure and the return exposure.

A control method of a shutter apparatus according to another aspect of the present invention so as to move a light shielding member in a first direction for a forward exposure, and in a second direction opposite to the first direction for a return exposure includes the steps of moving the light shielding member by a first exposure correction amount during the forward exposure, and moving the light shielding member by a second exposure correction amount different from the first exposure correction amount during the return exposure. A non-transitory computer-readable storage medium storing a program for causing a computer to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
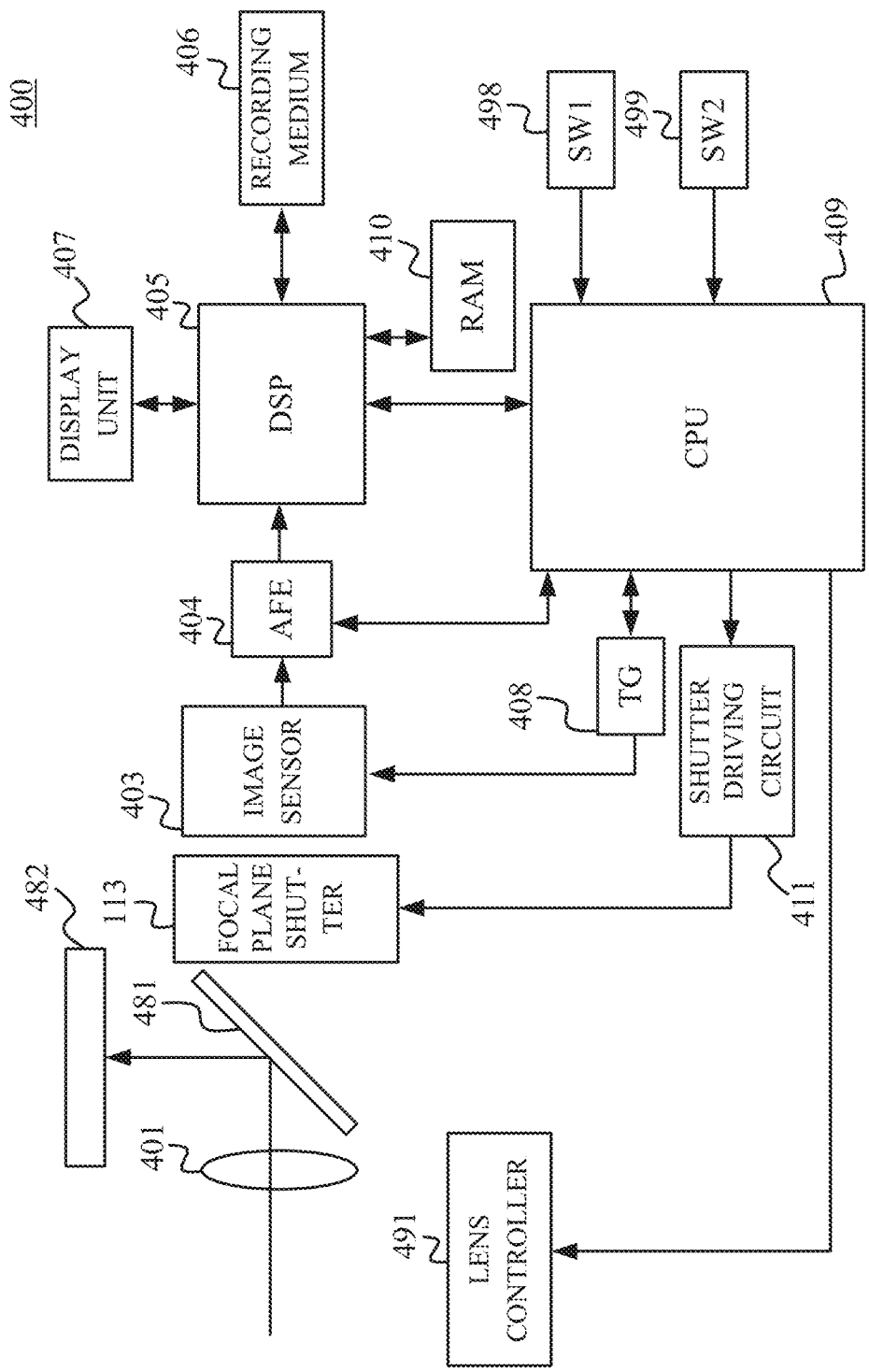
FIG. 1 is a block diagram of an imaging apparatus according to each embodiment.

Referring now to FIG. 1, a description will be given of an imaging apparatus according to a first embodiment of the present invention. FIG. 1 is a block diagram of an imaging apparatus 400. In FIG. 1, reference numeral 401 denotes an imaging lens (imaging optical system), reference numeral 113 denotes a focal plane shutter (shutter apparatus), reference numeral 403 denotes an image sensor, reference numeral 481 denotes a mirror member, and reference numeral 482 denotes a viewfinder unit. When the imaging apparatus 400 is in the viewfinder observation state as illustrated in FIG. 1, part of object light that has passed through the imaging lens 401 is reflected on the mirror member 481 located on the imaging optical path, and guided to the viewfinder unit 482. Thereby, a photographer can observe the object image via the viewfinder unit 482. When the viewfinder observation state transfers to an imaging state or live-view state, the mirror member 481 is retracted from the imaging optical path by an unillustrated mirror member driving unit. Thereby, the object light from the imaging lens 401 travels to the image sensor 403.

The focal plane shutter 113 is disposed on the object side of the image sensor 403. Reference numeral 411 denotes a shutter driving circuit that drives the focal plane shutter 113. The focal plane shutter 113 has a plurality of blade units (first blade unit 2 and second blade unit 3 (see FIGS. 2 and 3)), and its driving is controlled by a CPU (control unit) 409 via a shutter driving circuit 411. In this embodiment, the CPU 409 and the shutter driving circuit 411 constitute a control unit. The focal plane shutter 113 has a first motor 100 and a second motor (see FIGS. 2 and 3). The first motor 100 and the second motor 101 rotate and drive a first cam gear 15 and a second cam gear 16, respectively, and are controlled by the shutter driving circuit 411.

Reference numeral 498 denotes a switch (SW1) for starting an imaging preparation, and reference numeral 499 denotes a switch (SW2) for starting imaging. The switch (SW1) 498 and the switch (SW2) 499 are configured as a two-stroke switch. The switch (SW1) 498 is turned on in the first stroke, and the switch (SW2) 499 is turned on in the second stroke.

The image sensor 403 includes a CMOS image sensor and the like, photoelectrically converts the object image (optical image) formed via the imaging lens (imaging optical system) 401, and outputs image data (analog image signal). An AFE (Analog Front End) 404 converts an analog image signal output from the image sensor 403 into a digital image signal. A DSP (Digital Signal Processor) 405 performs various image processing, compression/decompression processing, and the like for the digital image signal output from the AFE 404, and outputs the processed image data.

A recording medium 406 records the image data processed by the DSP 405. A display unit 407 includes a liquid crystal display (LCD) and the like, and displays a captured image and a variety of menu screens. A TG 408 is a timing generator and drives and controls the image sensor 403. An RAM 410 is connected to the DSP 405 and temporarily stores image data and the like.

A lens controller 491 outputs lens information such as a focal length, an aperture diameter, an exit pupil diameter, and a distance between the exit pupil of the imaging lens 401 and the image sensor 403 to the CPU 409. A lens controller 491 drives a diaphragm (aperture stop), a lens, and the like included in the imaging lens 401 according to control by the CPU (control unit) 409. The detection result of the detector included in the lens controller 491 is input into the CPU 409. The CPU 409 controls the AFE 404, DSP 405, TG 408, shutter driving circuit 411, and the lens controller 491.

Figure 2:
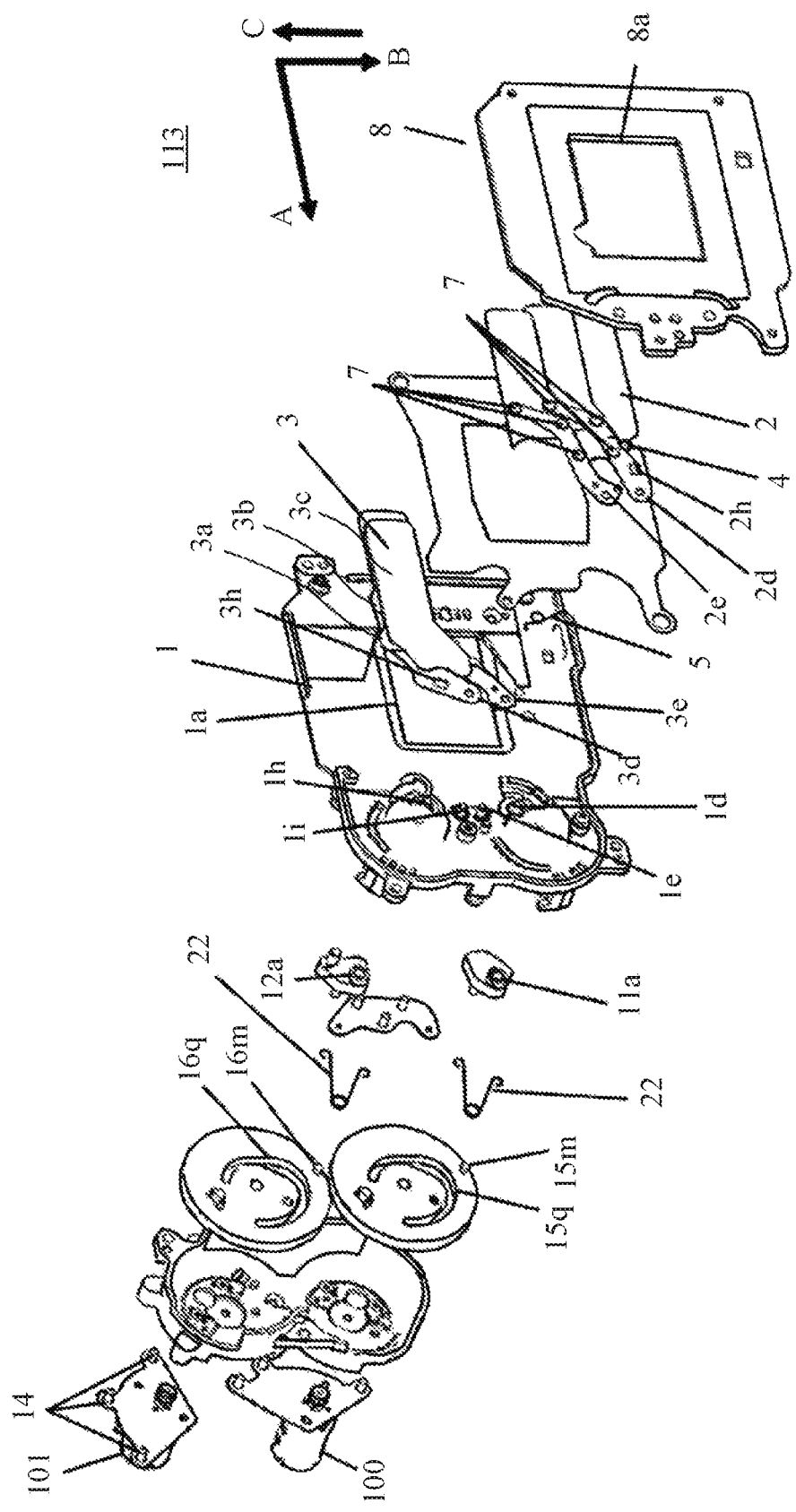
FIG. 2 is an exploded perspective view of a shutter apparatus according to the first embodiment viewed from an image sensor side.
Figure 3:
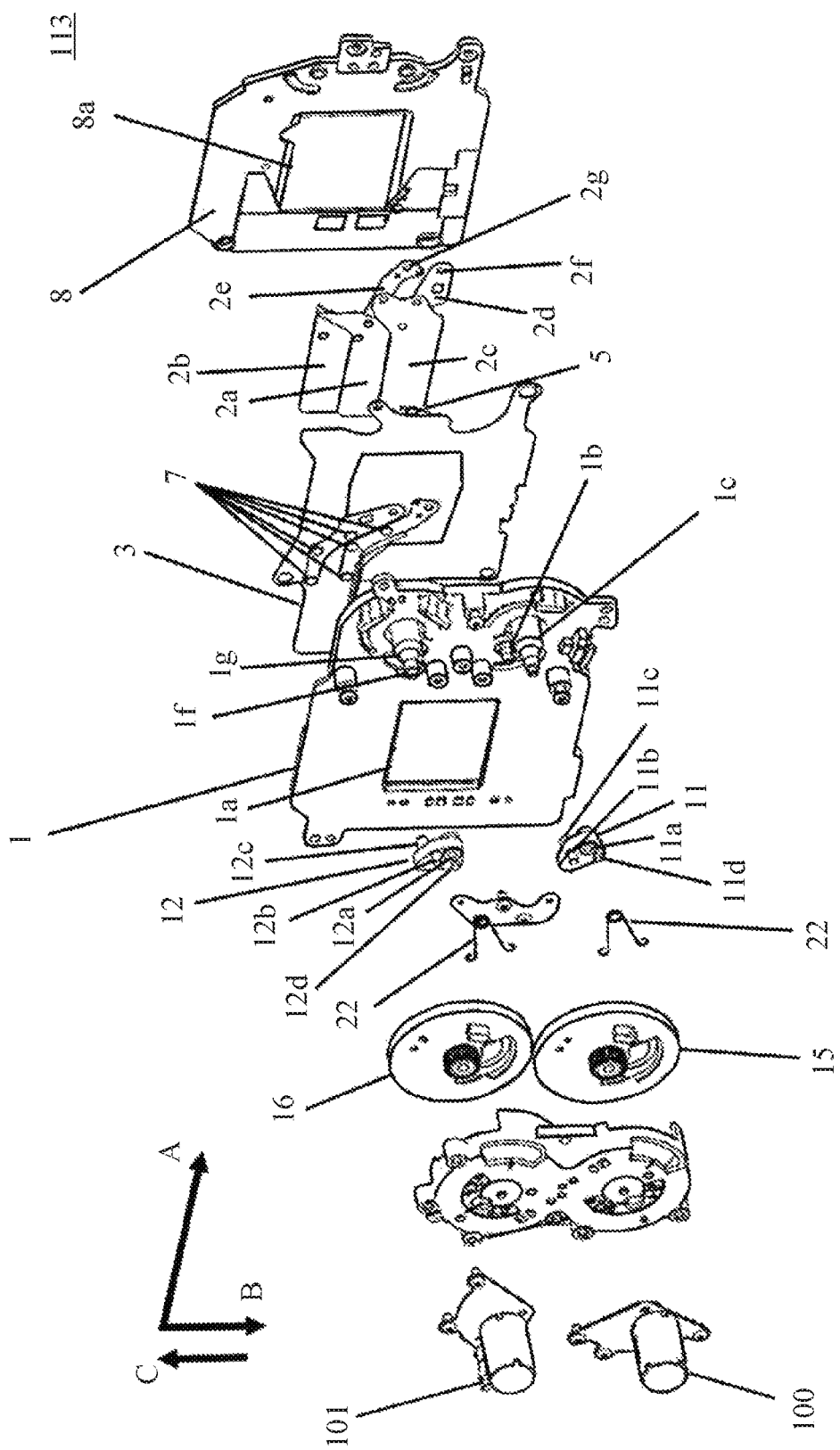
FIG. 3 is an exploded perspective view of the shutter apparatus according to the first embodiment viewed from an object side.

Referring now to FIGS. 2 and 3, a description will be given of a structure of the focal plane shutter (shutter apparatus) 113. FIG. 2 is an exploded perspective view of the focal plane shutter 113 viewed from the image sensor 403 side (image plane side). FIG. 3 is an exploded perspective view of the focal plane shutter 113 viewed from the object side.

A cover plate 8 is attached to the shutter base plate 1 on the image sensor 403 side (image plane side). Between the shutter base plate 1 and the cover plate 8, there are a first blade unit (first light shielding member) 2 including blades 2a, 2b, and 2c and blade arms 2d and 2e, and a second blade unit (second light shielding member) 3 including blades 3a, 3b and 3c, and blade arms 3d and 3e. The shutter base plate 1 and the cover plate 8 are respectively formed with apertures (openings) 1a and 8a through which imaging light passes. Each of the first blade unit 2 and the second blade unit 3 is movable to provide a closed state for closing the aperture 1a is closed and an open state for opening the aperture 1a.

Shafts 1b, 1c, 1f, and 1g stand on the object side of the shutter base plate 1. The first drive member 11 is rotatably attached to the shaft 1b, the second drive member 12 is rotatably attached to the shaft 1f, the first cam gear 15 is rotatably attached to the shaft 1c, and the second cam gear 16 is rotatably attached to the shaft 1g. The first cam gear 15 is connected to the first motor (first actuator) 100 via a gear. The second cam gear 16 is connected to the second motor (second actuator) 101 via a gear.

Shafts 1d, 1e, 1h, and 1i stand on the image sensor 403 side of the shutter base plate 1, the first blade unit 2 is rotatably attached to the shafts 1d and 1e, and the second blade unit 3 is rotatably attached to the shafts 1h and 1i.

The first drive member 11 is rotatable because its hole 11a and the shaft 1b of the shutter base plate 1 are engaged with each other. A cam engaging pin 11b of the first drive member 11 is slidably engaged with a cam groove 15q in a first cam gear 15 described later, and the cam engaging pin 11b drives the first drive member 11 along the cam groove 15q as the first cam gear 15 rotates. The first drive member 11 has a pin 11d, and the first cam gear 15 has a pin 15m, and a toggle spring 22 is engaged with each of them to generate a biasing force.

The second drive member 12 is rotatable because its hole 12a and the shaft 1f of the shutter base plate 1 are engaged with each other. A cam engaging pin 12b of the second drive member 12 is slidably engaged with a cam groove 16q in the second cam gear 16, and the cam engaging pin 12b drives the second drive member 12 along the cam groove 16q as the second cam gear 16 rotates. The second drive member 12 has a pin 12d, and the second cam gear has a pin 16m, and the toggle spring 22 is engaged with each of them to generate a biasing force.

The first blade unit 2 has two blade arms 2d and 2e and three blades 2a, 2b, and 2c. Holes 2f and 2g in the two blade arms 2d and 2e are rotatably attached to the shafts 1d and 1e on the image sensor 403 side of the shutter base plate 1, respectively. The three blades 2a, 2b, and 2c are sequentially connected to the other ends of the blade arms 2d and 2e via coupling shafts 7. A hole 2h is formed in the blade arm 2d, and the drive pin 11c of the first drive member 11 is engaged with the hole 2h. The first blade unit 2 transfers between the closed state in which the blades 2a, 2b, and 2c cover the aperture 1a in the shutter base plate 1 and the open state in which the blades 2a. 2b, and 2c retreat from the aperture 1a as the first drive member 11 rotates.

The second blade unit 3 has two blade arms 3d and 3e and three blades 3a, 3b, and 3c. Holes 3f and 3g in the two blade arms 3d and 3e are rotatably attached to the shafts 1h and 1i on the image sensor 403 side of the shutter base plate 1, respectively. The three blades 3a, 3b, and 3c are sequentially connected to the other ends of the blade arms 3d and 3e via the coupling shafts 7. A hole 3h is formed in the blade arm 3d, and the drive pin 12c of the second drive member 12 is engaged with the hole 3h. As the second drive member 12 rotates, the second blade unit 3 transfers between the closed state where the blades 3a, 3b, and 3c cover the aperture 1a in the shutter base plate 1 and the open state in which the blades 3a, 3b, and 3c retreat from the aperture 1a.

The shutter driving circuit 411 is electrically connected to the first motor 100 and the second motor 101, and changes the voltage driving condition such as the magnitude of the voltage, the voltage waveform, and the phase difference among the plurality of voltages, thereby freely controlling the outputs of the first motor 100 and the second motor 101. Each of the first motor 100 and the second motor 101 includes an optical encoder for detecting the rotational position. An output signal from this encoder is electrically connected to the shutter driving circuit 411. The shutter driving circuit 411 can perform a feedback control by changing the voltage driving condition to each motor (actuator) according to a difference from a moving trajectory (running or traveling trajectory) described later, using the output signal of the encoder. Thereby, the moving trajectory can be made highly accurate.

The imaging apparatus 400 includes a temperature sensor that detects the temperature and an orientation sensor that detects the orientation of the shutter apparatus. Hence, the imaging apparatus 400 can recognize a load change of the shutter apparatus and the output change of the motor due to the temperature and the orientation based on such information. By setting the voltage driving condition according to this to the initial value at the time of feedback, a deviation of the moving trajectory when driving starts can be reduced, and the control can be prevented from oscillating. The control can also be prevented from oscillating by setting the voltage driving condition of the most recent operation to the initial value. This is suitable for dealing with gradual changes due to durable abrasions in repetitive operations, etc.

Due to the above structure, the shutter driving circuit (control circuit) 411 controls the first motor 100 (first actuator) and the second motor 101 (second actuator). Thereby, the shutter driving circuit 411 can move the first cam gear 15 and the second cam gear, and control driving of the first blade unit (first light shielding member) 2 and the second blade unit (second light shielding member) 3.

Next follows a detailed description of the problem of the present invention. The shutter apparatus causes an image distortion generally called a rolling shutter distortion or rolling shutter phenomenon. The image distortion direction differs between the forward exposure and the return exposure. For a user who wishes to align the directions of the distortions with one another in capturing a plurality of images, even the shutter apparatus that can provide the reciprocating exposure is demanded to repeat the one-way exposure, i.e., the forward exposure or the return exposure.

In addition to the moving operation for exposure that opens a predetermined optical path of the shutter apparatus, the one-way exposure needs a return operation to return the two blade units to the pre-exposure standby positions without exposing the image sensor by closing the optical path. In order to completely close the shutter during this return operation, it is necessary to maintain a partial overlap of parts in the two blade units in the optical axis direction that opens and closes the optical path can each other, and to arrange these parts at front and back positions in the optical axis direction.

A new problem arises due to the front and back relationship in the optical axis direction between the optical path opening part and the optical path closing part of the two blade units. Even if the opening width of the shutter is the same, this relationship causes different opening angles depending on the exposure position of the image sensor when the shutter opening part is viewed from the pupil position of the optical system. The exposure amount becomes large at the exposure position of the image sensor with a large opening angle, and the exposure amount becomes small at the exposure position of the image sensor with a small opening angle. Because of this phenomenon, it is necessary to correct the shutter opening width according to the exposure position of the image sensor. The reciprocating exposure shutter is demanded to properly correct the opening width not only in the forward exposure but also in the return exposure.

Figure 4A:
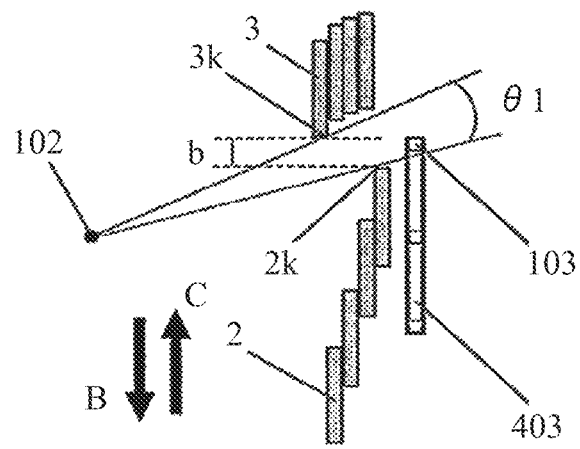
FIGS. 4A, 4B, and 4C illustrate a positional relationship between the image sensor and the shutter apparatus according to the first embodiment.
Figure 4B:
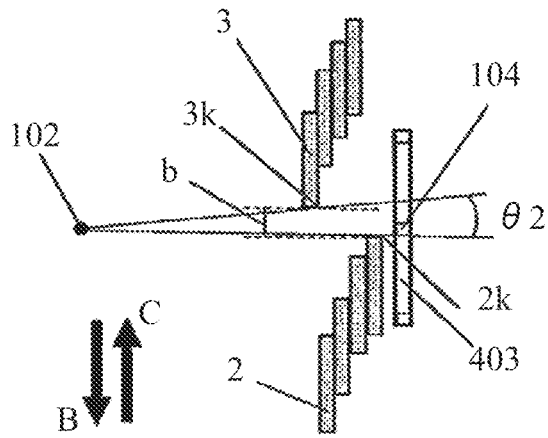
Figure 4C:
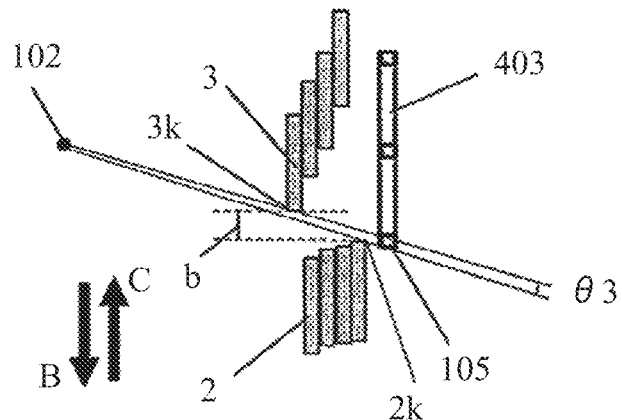

FIGS. 4A to 4C illustrate the positional relationship between the image sensor 403 and the focal plane shutter 113. FIGS. 4A to 4C illustrate the image sensor 403 and two blade units (first blade unit 2 and second blade unit 3) viewed from the direction indicated by the arrow A in FIGS. 2 and 3. In FIGS. 2 to 4C, a direction B indicates the same direction (first direction). In FIGS. 4A to 4C, reference numeral 102 denotes the pupil position of the imaging lens 401. Imaging light from the object passes through the pupil position 102 of the imaging lens 401, passes through the focal plane shutter 113, and reaches the image sensor 403. The first blade unit 2 is moved in the direction B, and the shutter is opened by an end $2k$ of the first blade unit 2. Next, a slit having a width b is opened, the second blade unit 3 is moved in the B direction (forward path), and the shutter is closed by an end $3k$ of the second blade unit 3. During this operation, the entire surface of the image sensor 403 is exposed while the state changes in order of FIG. 4A, FIG. 4B, and FIG. 4C. The second blade unit 3 is located closer to the pupil position 102 than the first blade unit 2.

FIG. 4A focuses on the uppermost image capturer 103 of the image sensor 403. The imaging light passes through the pupil position 102 and the slit having the width b, and reaches the uppermost image capturer 103. An angle of $\theta1$ is formed by the pupil position 102 and the slit.

FIG. 4B focuses on the central image capturer 104 of the image sensor 403. The end (first light shielding end) $2k$ of the first blade unit 2 and the end (second light shielding end) $3k$ of the second blade unit 3 moves to the B direction from FIG. 4A while the width b of the slit in FIG. 4A is maintained. The imaging light passes through the pupil position 102 and the slit having the width b, and reaches the central image capturer 104. An angle of $\theta2$ is formed by the pupil position 102 and the slit. The angle $\theta2$ is smaller than the angle $\theta1$ when the uppermost image capturer 103 is exposed.

FIG. 4C focuses on the lowermost image capturer 105 of the image sensor 403. The end $2k$ of the first blade unit 2 and the end $3k$ of the second blade unit 3 move in the B direction from FIG. 4B while the width b of the slit is maintained in FIG. 4A. The imaging light passes through the pupil position 102 and the slit b, and reaches the lowermost image capturer 105. An angle of $\theta3$ is formed by the pupil position 102 and the slit is $\theta3$. The angle $\theta3$ is smaller than the angle $\theta2$ in exposing the central image capturer 104. Thus, the angles during the exposure have a relationship of $\theta1>\theta2>\theta3$.

Figure 5:
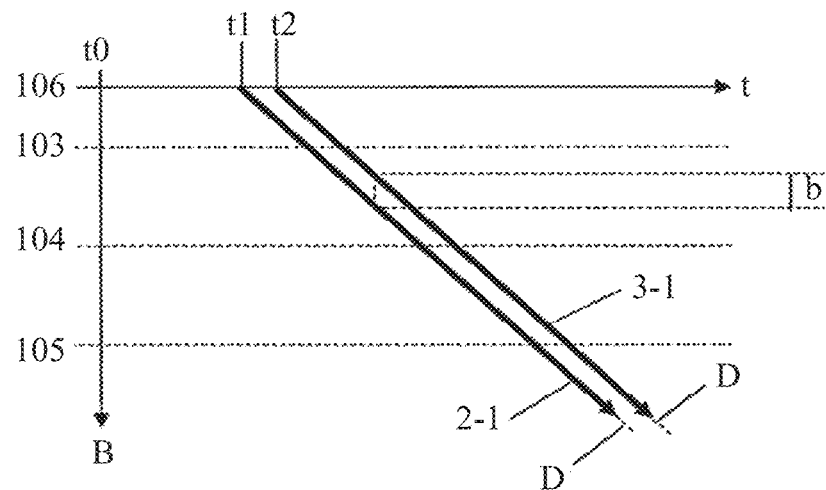
FIG. 5 illustrates moving trajectories of a first light shielding member and a second light shielding member during a forward exposure according to the first embodiment.

FIG. 5 illustrates moving trajectories (or curves) of the first blade unit 2 and the second blade unit 3 during the forward exposure. In FIG. 5, an abscissa axis represents the elapsed time t based on time (reference time t0) when the switch SW2 for starting imaging is pressed. An ordinate axis represents the positions in the B direction and the moving amounts of the first blade unit 2 and the second blade unit 3 where the pre-imaging standby position 106 is set to the reference position. Reference numeral 2-1 denotes a moving trajectory (first moving trajectory) of the end $2k$ of the first blade unit 2 used for the forward exposure. Reference numeral 3-1 denotes a moving trajectory (second moving trajectory) of the end 3k of the second blade unit 3 used for the forward exposure. The moving trajectory is a position in the B direction at the elapsed time t. In the ordinate axis in FIG. 5, the uppermost image capturer 103, the central image capturer 104, and the lowermost image capturer 105 of the image sensor 403 are illustrated.

The end 2k of the first blade unit 2 starts moving at the elapsed time t1 after the reference time t0. Thereafter, after Δt (=t2−t1) corresponding to a predetermined exposure time, the end 3k of the second blade unit 3 also starts moving. The respective slopes D of the moving trajectories 2-1 and 3-1 correspond to the speed of the moving trajectory. Here, the moving trajectories 2-1 and 3-1 have the same constant speed and maintain the slit width b. Thus, the moving trajectory that keeps the slit width b constant satisfies the angular relationship of θ1>θ2>θ3 during the exposure, and therefore the exposure time is different depending on the positions of the image capturers 103 to 105 of the image sensor 403. The exposure time T1 of the uppermost image capturer 103, the exposure time T2 of the central image capturer 104, and the exposure time T3 of the lowermost image capturer 105 satisfy T1>T2>T3, which results in the exposure unevenness. In order to reduce (or prevent) the exposure unevenness, it is necessary to reduce the exposure time T1 and increase the exposure time T3. The moving trajectory will now be described.

Figure 6:
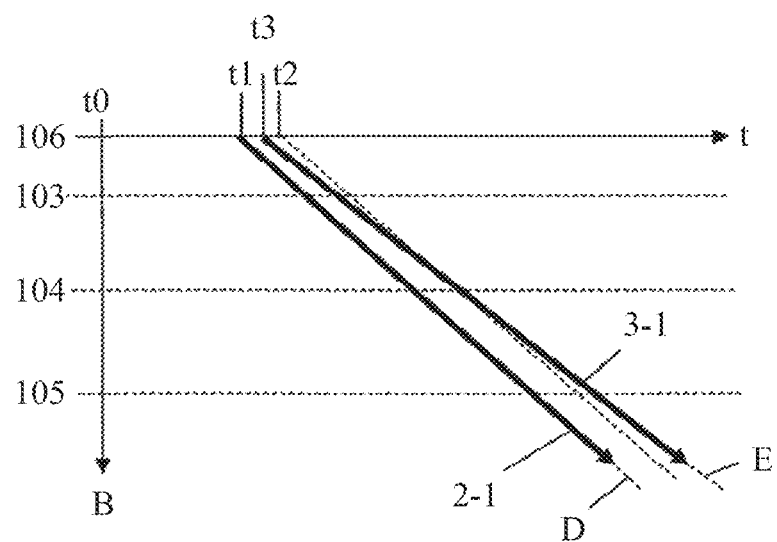
FIG. 6 illustrates moving trajectories of the first light shielding member and the second light shielding member for reducing exposure unevenness during the forward exposure according to the first embodiment.

FIG. 6 illustrates a moving trajectory for reducing the exposure unevenness during the forward exposure. The ordinate axis and abscissa axis in FIG. 6 are similarly defined as those in FIG. 5, respectively. In FIG. 6, the moving trajectory (second moving trajectory) 3-1 of the end 3k of the second blade unit 3 is different from the moving trajectory 3-1 in FIG. 5. As indicated by the moving trajectory 3-1 in FIG. 6, the end 3k of the second blade unit 3 starts moving at time t3 (<t2−t1+Δt) that is earlier than the predetermined exposure time Δt in FIG. 5. As a result, the exposure time T1 of the uppermost image capturer 103 can be shortened. In FIG. 6, the moving trajectory 3-1 has a speed (inclination E in FIG. 6 or speed) lower than that in FIG. 5 (E<D). Thereby, the exposure time gradually increases toward the lowermost image capturer 105, and the exposure time T3 of the lowermost image capturer 105 can be increased. If the time t3 that is the moving start timing of the moving trajectory 3-1 and the speed D are set so as to cancel the relationship of θ1>θ2>θ3, a proper exposure time Δt can be set on the entire surface of the image sensor 403 (Δt=T1=T2=T3).

Figure 7:
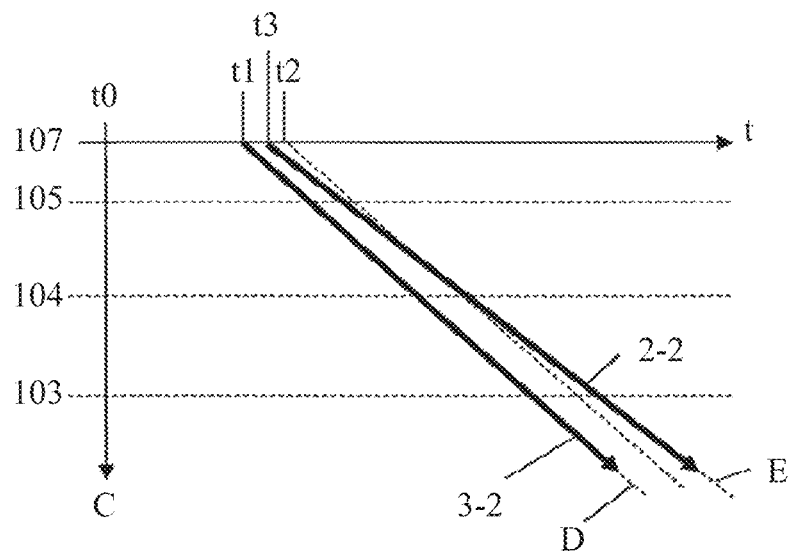
FIG. 7 illustrates moving trajectories of the first light shielding member and the second light shielding member during the return exposure according to the first embodiment.

Next follows a description of the first blade unit 2 and the second blade unit 3 moving on the return path (direction C (second direction) in FIGS. 2 to 5). FIG. 7 illustrates moving trajectories of the first blade unit 2 and the second blade unit 3 during the return exposure. Reference numeral 2-2 denotes a moving trajectory (third moving trajectory) of the end 2k of the first blade unit 2 used for the return exposure. Reference numeral 3-2 denotes a moving trajectory (fourth moving trajectory) of the end 3k of the second blade unit 3. In comparison with FIG. 5, the direction of the ordinate axis is turned from the B direction (first direction) to the C direction (second direction). Reference numeral 107 denotes a standby position of each of the first blade unit 2 and the second blade unit 3 during the return exposure.

During the return exposure, the shutter is opened by the end 3k of the second blade unit 3 and the shutter is closed by the end 2k of the first blade unit 2. The return exposure (C direction) is different from the forward exposure (B direction) in that the light shielding member that starts moving first is the second blade unit 3, and the light shielding member that starts moving later is the light shielding member that is the first blade unit 2. Accordingly, the standby time t1 and the speed D are set for the moving trajectory 3-1 of the end 3k of the second blade unit that is moved first. The standby time t3 (<t2−t1+Δt) and the speed E are set for the moving trajectory 2-1 of the end 2k of the first blade unit 2 to be moved later. The moving trajectory 3-2 at the standby time t1 and the speed D is the fourth moving trajectory, and the moving trajectory 2-2 at the standby time t3 and the speed E is the third moving trajectory.

Hence, when the moving trajectory (standby time and speed) in the forward exposure is simply changed during the return exposure, the exposure unevenness occurs as follows. As described with reference to FIGS. 4A to 4C, depending on the angular relationship of θ1>θ2>θ3 during the exposure, the exposure time differs if the positions of the image capturers 103 to 105 of the image sensor 403 are different. When the first blade unit 2 and the second blade unit 3 run at the same constant speed, the exposure time T1 of the same uppermost image capturer 103, the exposure time T2 of the central image capturer 104, and the exposure time T3 of the lowermost image capturer 105 cause T1>T2>T3. Hence, when the moving trajectories are set as illustrated in FIG. 5 during the return exposure, the time from the end 3k of the second blade unit 3 to the end 2k of the first blade unit 2 is different among the image capturers 103 to 105. When the passage time at the central image capturer 104 is set to the reference, the passage time at the uppermost image capturer 103 is longer and the passage time at the lower image capturer 105 is shorter. Thereby, the exposure unevenness depending on the location of the image sensor 403 is further enlarged.

Figure 8:
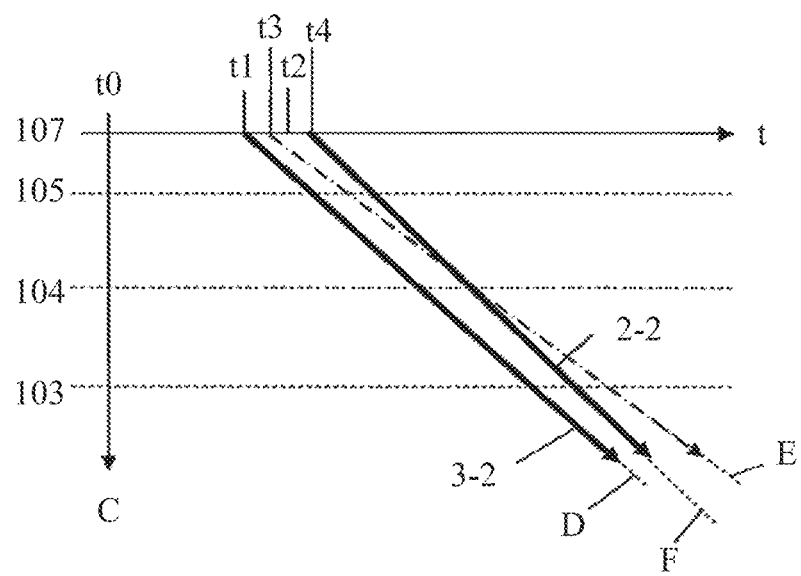
FIG. 8 illustrates moving trajectories of the first light shielding member and the second light shielding member during the return exposure in the first embodiment.
Figure 9:
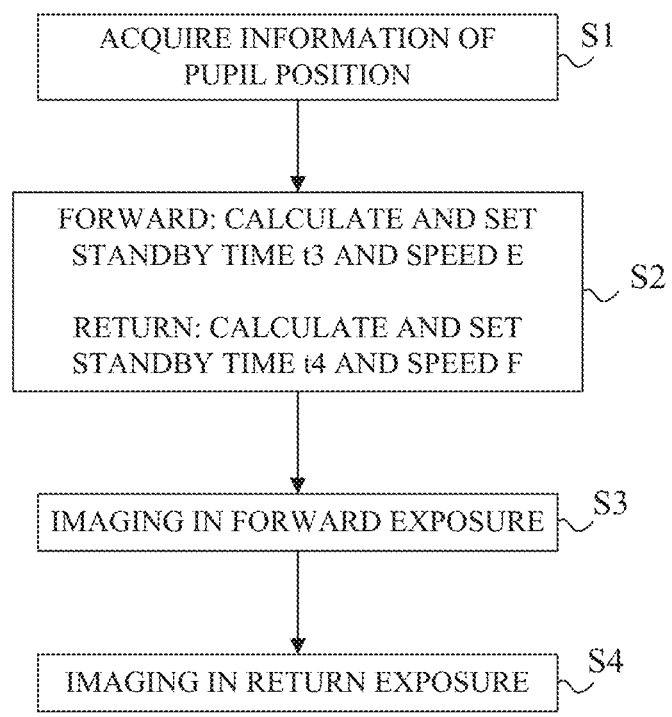
FIG. 9 is a flowchart of a method for controlling the shutter apparatus according to the first embodiment.
Figure 10:
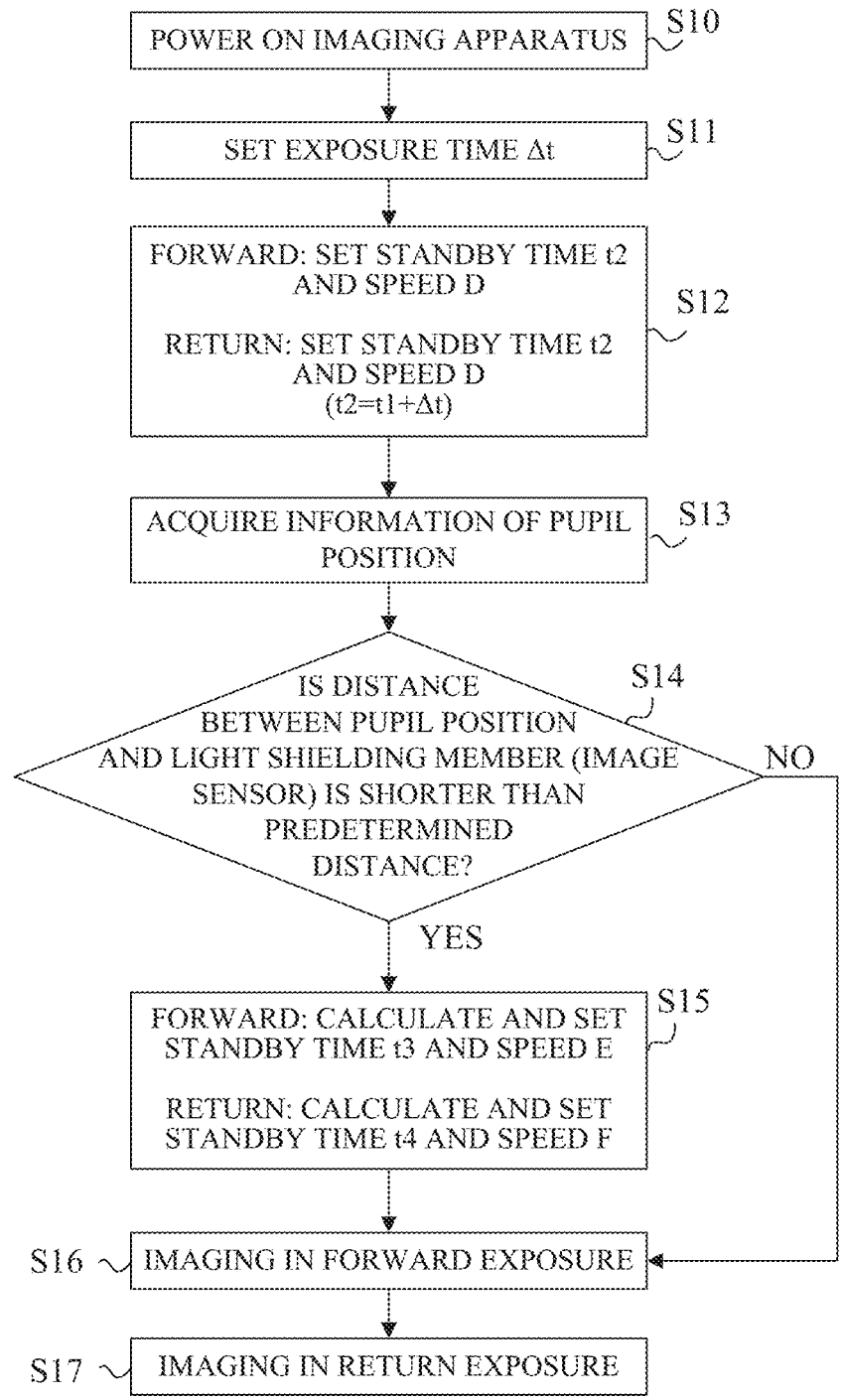
FIG. 10 is a flowchart of a control method of the shutter apparatus according to the first embodiment.

Referring now to FIG. 8 to FIG. 10, a description will be given of a method (control method of shutter apparatus) for setting the moving trajectory of the first blade unit 2 and the second blade unit for obtaining a more proper exposure amount in both the forward exposure and the return exposure. FIG. 8 illustrates moving trajectories of the first blade unit 2 and the second blade unit 3 during the return exposure according to this embodiment. In FIG. 8, the moving trajectory (third moving trajectory) 2-2 of the end 2k of the first blade unit 2 is different from the moving trajectory 2-2 of FIG. 7 in standby time and speed. On the other hand, in FIG. 8, the moving trajectory (fourth moving trajectory) 3-2 of the end 3k of the second blade unit 3 is the same as the moving trajectory 3-2 in FIG. 7.

The standby time t4 of the moving trajectory 2-2 illustrated in FIG. 8 is different from the standby time t3 of the moving trajectory 2-2 illustrated in FIG. 7. The standby time t4 is later than the time t2 obtained by adding a predetermined time Δt to the time t1 at which the end 3k of the second blade unit 3 starts moving (t4>t2=t1+Δt). Thereby, the exposure time of the lowermost image capturer 105 can be changed longer. The speed (slope F) of the moving trajectory 2-2 illustrated in FIG. 8 is changed so as to increase, unlike the speed (slope E) of the moving trajectory 2-2 illustrated in FIG. 7 (F>E). Thereby, the exposure time can be gradually shortened toward the uppermost image capturer 103. When the standby time t4 and the speed F are set so as to cancel the relationship of θ1>θ2>θ3, the exposure time Δt on the entire surface of the image sensor 403 can be properly controlled (Δt=T1=T2=T3).

Referring now to FIGS. 4A to 4C, a description will be given of a setting method (control method) of the standby time t4 and the speed F in consideration of the pupil position 102 of the imaging lens 401. If the pupil position 102 is at an infinite distance from the image sensor 403, θ1, θ2, and θ3 are equal to each other. On the contrary, when this distance becomes smaller, the differences among θ1, θ2, and θ3 increase. Based on this relationship, information on the pupil position 102 is obtained from the imaging lens 401 and the standby time t4 and speed F are set, so that an appropriate exposure time can be realized on the entire surface of the image sensor 403.

FIG. 9 is a flowchart of a method for controlling the focal plane shutter 113 according to this embodiment. Each step in FIG. 9 is mainly executed by the CPU 409 or by the focal plane shutter 113 or the image sensor 403 based on these instructions.

Initially, in the step S1, the CPU 409 acquires information on the pupil position 102 from the imaging lens 401. Next, in the step S2, the CPU 409 calculates and sets the standby time t3 and speed E (slope E) of the moving trajectory 3-1 during the forward exposure so that the exposure time is proper on the image sensor 403. Similarly, the CPU 409 calculates and sets the standby time t4 and the speed F (inclination F) of the moving trajectory 2-2 during the return exposure.

Next, in the step S3, the CPU 409 performs a shutter operation for the forward exposure and captures an image with the image sensor 403. Next, in the step S4, the CPU 409 performs a shutter operation for the return exposure and performs imaging with the image sensor 403.

When the pupil position 102 is farther than the image sensor 403, the differences among θ1, θ2, and θ3 becomes smaller. Therefore, the moving trajectory (standby time, speed) may be changed according to the distance between the pupil position 102 of the imaging lens 401 and the light shielding member (first blade unit 2, second blade unit 3) or the image sensor 403. In other words, when this distance is smaller than the predetermined distance (or less than the predetermined distance), the moving trajectory (standby time, speed) is changed between the forward exposure and the return exposure. On the other hand, when this distance is larger than a predetermined distance (or larger than the predetermined distance), the moving trajectory (standby time, speed) is maintained between the forward exposure and the return exposure. Thereby, a proper exposure time can be realized with simple processing when the pupil position is sufficiently far.

Referring now to FIG. 10, a description will be given of this control method (control method according to a variation). FIG. 10 is a flowchart of the control method according to the variation. Each step in FIG. 10 is mainly executed by the CPU 409 or by the focal plane shutter 113 or the image sensor 403 based on these instructions.

Initially, in the step S10, when the user turns on the power switch of the imaging apparatus 400, the flow proceeds to the step S11. In the step S11, the CPU 409 sets an exposure time (shutter speed) Δt by a photometry performed by the imaging apparatus 400 or a user setting operation. Next, in the step S12, the CPU 409 sets the moving trajectories illustrated in FIG. 5. At this time, the CPU 409 sets the standby time t1 and the speed D in the moving trajectory 2-1 of the end 2k of the first blade unit 2 for both the forward exposure and the return exposure. In both the forward exposure and the return exposure, the standby time t2 and the speed D are set in the moving trajectory 3-1 of the end 3k of the second blade unit 3. The standby time t2 is a value obtained by adding the exposure time Δt to the standby time t1. The speeds of the moving trajectory 2-1 of the end 2k and the moving trajectory 3-1 of the end 3k are set to values equal to each other or the speed D.

Next, in the step S13, the CPU 409 acquires information on the pupil position 102 of the imaging lens 401. Next, in the step S14, the CPU 409 determines whether or not the distance between the pupil position 102 and the image sensor 403 or the focal plane shutter 113 (light shielding member) is smaller than a predetermined distance. If the distance is shorter than the predetermined distance, the flow proceeds to the step S15. On the other hand, if the distance is equal to or longer than the predetermined distance, the flow proceeds to the step 16 without executing the step S15.

In the step S15, the CPU 409 performs the same processing as that of the step S2 described with reference to FIG. 9. In other words, the CPU 409 calculates the standby time t3 and speed E for the forward exposure and the standby time t4 and speed F for the return exposure so as to cancel the relationship of θ1>θ2>θ3. Then, the CPU 409 sets the moving trajectory 2-2 of the end 2k of the first blade unit and the moving trajectory 3-2 of the end 3k of the second blade unit 3.

Next, in the step S16, the CPU 409 performs a shutter operation for the forward exposure and captures an image with the image sensor 403. Next, in the step S17, the CPU 409 performs the shutter operation for the return exposure and performs imaging with the image sensor 403.

Second Embodiment

Referring now to FIGS. 11 to 14, a description will be given of a second embodiment according to the present invention. This embodiment is different from the first embodiment in moving trajectories (or curves) of the first blade unit 2 and the second blade unit 3.

Figure 11:
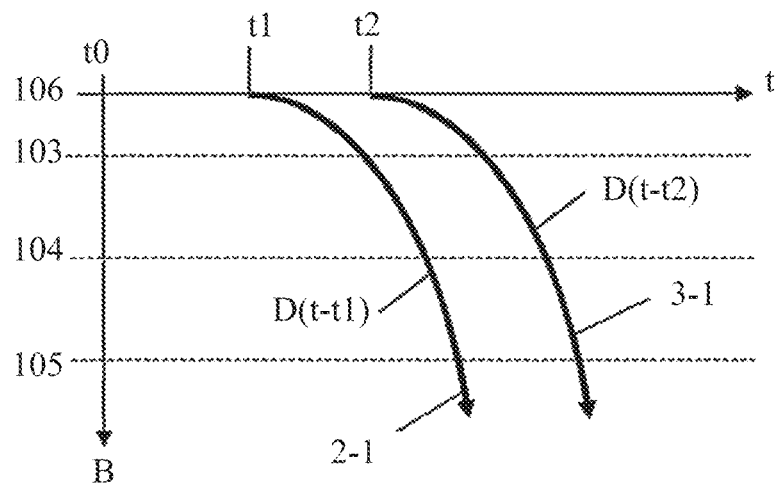
FIG. 11 illustrates moving trajectories of the first light shielding member and the second light shielding member during the forward exposure according to a second embodiment.

FIG. 11 illustrates moving trajectories of the first blade unit 2 and the second blade unit 3 during the forward exposure according to this embodiment. As illustrated in FIG. 11, each of the moving trajectory (first moving trajectory) 2-1 of the end 2k of the first blade unit 2 and the moving trajectory (second moving trajectory) 3-1 of the end 3k of the second blade unit 3 is a moving trajectory in which the speed D accelerates with time. The speed D is expressed by a function with the elapsed time, such as D(t–t1) for the moving trajectory 2-1 and D(t–t2) for the moving trajectory 3-1. The speed D(t–t1) and the speed D(t–t2) are equal acceleration motions, and D(t–t1)=α(t–t1) and D(t–t2)=α(t–t2) using a constant acceleration α.

FIG. 11 illustrates a moving trajectory when the pupil position 102 of the imaging lens 401 is sufficiently far from the light shielding member or the image sensor. Here, the pupil position 102 being sufficiently far can be considered to be θ1=θ2=θ3 in FIGS. 4A-4C for practical use of imaging. In this case, the CPU 409 determines in the step S14 in FIG. 10 that the distance between the pupil position 102 and the light shielding member or the image sensor is equal to or greater than the predetermined distance. Then, the CPU 409 sets the standby time t1 and the speed D(t–t1) for the moving trajectory 2-1 of the end 2k of the first blade unit 2 during the forward exposure. The CPU 409 sets the standby time t2 and the speed D(t–t2) for the moving trajectory 3-1 of the end 3k of the second blade unit 3. By setting the standby times and speeds of the moving trajectories 2-1 and 3-1 so as to satisfy t2=t1+Δt, a time difference when the ends 2k and 3k of the blade units pass the same portion can be maintained to be Δt over the entire surface of the image sensor 403.

Figure 12:
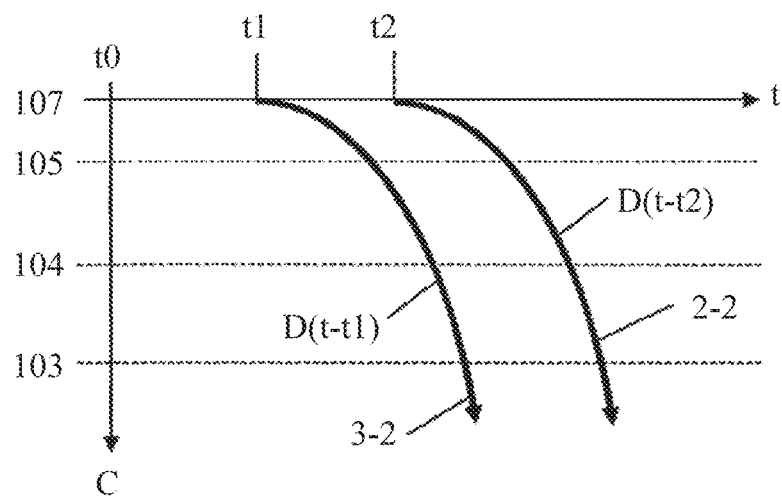
FIG. 12 illustrates moving trajectories of the first light shielding member and the second light shielding member during the return exposure according to the second embodiment.

FIG. 12 illustrates moving trajectories of the first blade unit 2 and the second blade unit 3 during the return exposure in this embodiment. As illustrated in FIG. 12, the return exposure changes the moving direction of each blade unit from the B direction to the C direction in comparison with the forward exposure, and exchanges the moving trajectory of the end $2k$ of the first blade unit 2 and the moving trajectory of the ends $3k$ of the two blade units 3 with each other. In other words, the CPU 409 sets the standby time t1 and the speed D(t−t1) for the moving trajectory (fourth moving trajectory) 3-2 of the end $3k$ of the second blade unit 3 in the return exposure. The CPU 409 sets the standby time t2=t1+Δt and the speed D(t−t2) for the moving trajectory (third moving trajectory) 2-2 of the end $2k$ of the first blade unit 2. Thereby, similar to the forward exposure, the time difference when the ends $2k$ and $3k$ of the blade units pass the same portion can be kept Δt on the entire surface of the image sensor 403.

Next follows a description of a moving trajectory when the distance between the image sensor 403 or the focal plane shutter 113 (light shielding member) and the imaging lens 401 is shorter than a predetermined distance and θ1>θ2>θ3 is established. Even when the moving trajectory is an acceleration trajectory as in this embodiment, the relationship θ1>θ2>θ3 described with reference to FIGS. 4A to 4C affects the exposure time, as in the first embodiment of the constant speed trajectory. In this case, in the step S14 in FIG. 10, the CPU 409 determines that the distance from the image sensor 403 or the focal plane shutter 113 to the pupil position 102 is shorter than the predetermined distance, and proceeds to the step S15.

Figure 13:
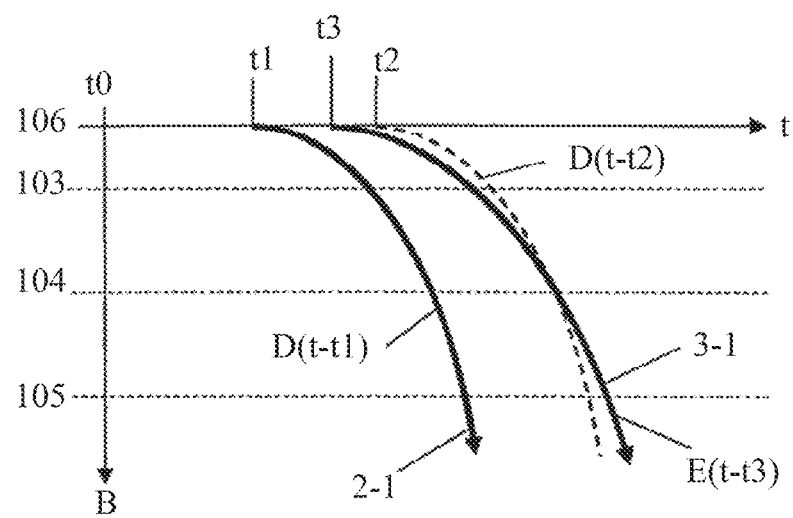
FIG. 13 illustrates moving trajectories of the first light shielding member and the second light shielding member during the forward exposure according to the second embodiment.

In the step S15, the CPU 409 sets the moving trajectory illustrated in FIG. 13 to the moving trajectory for the forward exposure. FIG. 13 illustrates the moving trajectories of the first blade unit 2 and the second blade unit 3 during the forward exposure in the step S15. The CPU 409 sets the standby time t3 (<t2=t1+Δt) and a speed E(t−t3) for the moving trajectory (second moving trajectory) 3-1 of the end $3k$ of the second blade unit 3. E(t−t3)=β(t−t3) is established with a constant acceleration β, where β is a value smaller than α. Thereby, the time difference when the two light shielding ends (ends $2k$ and $3k$) pass the same portion of the image sensor 403 is shorter than Δt in the uppermost image sensor 103 and equal to Δt in the central image sensor 104, and longer than Δt in the lowermost image sensor 105. By setting the standby time t3 and the acceleration β so as to cancel the relationship of θ1>θ2>θ3, the exposure time Δt can be realized on the entire surface of the image sensor 403.

Figure 14:
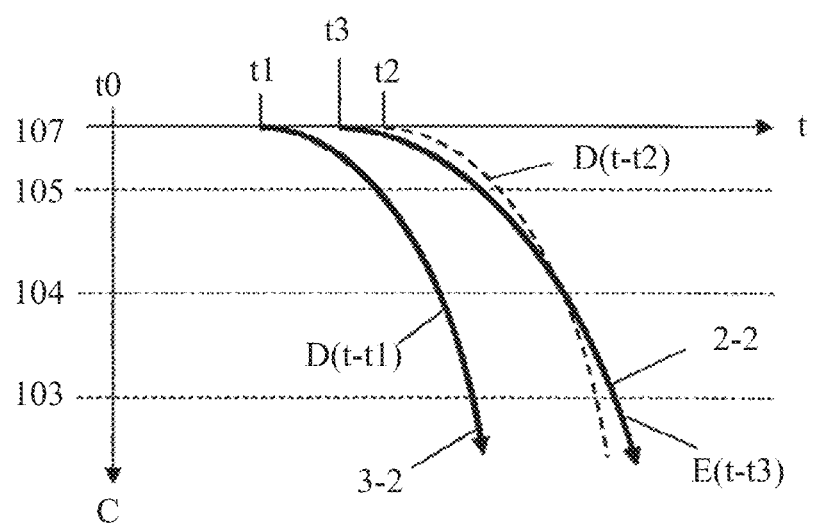
FIG. 14 explains exposure unevenness during the return exposure according to the second embodiment.

Referring now to FIG. 14, a description will be given of the exposure unevenness during the return exposure. FIG. 14 explains the exposure unevenness during the return exposure. FIG. 14 illustrates the moving direction of each blade unit made by simply switching the B direction to the C direction in comparison with the forward exposure in FIG. 13. The time difference when the ends $2k$ and $3k$ of the two blade units pass the same portion of the image sensor 403 is longer than Δt in the uppermost image capturer 103, equal to Δt in the central image capturer 104, and shorter than Δt in the lowermost image capturer 105. As a result, the influence of θ1>θ2>θ3 on the exposure cannot be cancelled, and disadvantageously increases to deteriorate the exposure unevenness.

Figure 15:
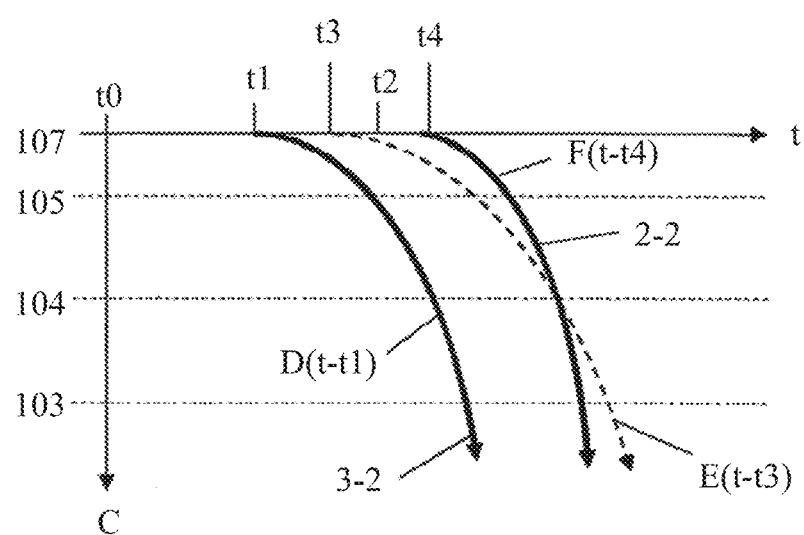
FIG. 15 illustrates moving trajectories of the first light shielding member and the second light shielding member for reducing the exposure unevenness during the return exposure according to the second embodiment.

Referring now to FIG. 15, a description will be given of a method for reducing the deterioration of the exposure unevenness. FIG. 15 illustrates moving trajectories of the first blade unit 2 and the second blade unit 3 for reducing the exposure unevenness during the return exposure. As illustrated in FIG. 15, the CPU 409 sets the standby time t4 (>t2=t1+Δt) and the speed F(t−t4) to the moving trajectory (third moving trajectory) 2-2 of the end $2k$ of the first blade unit 2. Herein, F(t−t4)=γ(t−t4) is established with a constant acceleration γ, where γ is a value larger than a. Thereby, the time difference when the ends $2k$ and $3k$ of the two blade units pass the same part of the image sensor 403 is shorter than Δt in the uppermost image capturer 103, equal to Δt in the central image capturer 104, and longer than Δt in the lowermost image capturer 105. Therefore, by setting the standby time t4 and the acceleration γ so as to cancel the relationship of θ1>θ2>θ3, the exposure time Δt can be realized on the entire surface of the image sensor 403.

Thus, in each embodiment, the shutter apparatus (focal plane shutter 113) includes the shutter base plate 1, the light shielding member (first blade unit 2 or second blade unit 3), and the control unit (CPU 409 or shutter driving circuit 411). The shutter base plate 1 has the aperture or opening 1*a*. The light shielding member can reciprocate to provide a closed state for closing the opening and an open state for opening the opening. The control unit controls the light shielding member so as to move the light shielding member in the first direction (B direction) for the forward exposure, and in the second direction (C direction) opposite to the first direction for the return exposure. Then, the control unit varies the exposure correction amount (such as a moving curve) of the light shielding member between the forward exposure and the return exposure. In other words, the control unit moves the light shielding member by the first exposure correction amount during the forward exposure, and by the second exposure correction amount during the return exposure.

The control unit may compensate a difference in exposure amount in a reciprocation of the light shielding member (such as corrects the moving trajectory (or curve)). The control unit may make different the moving trajectory between the forward exposure and the return exposure, which is a moving amount of the light shielding member from the reference position (standby positions 106 and 107) at the elapsed time t from the reference time t0. The control unit may make different the moving trajectory by changing a speed at which the light shielding member passes the opening. The control unit may make different the moving trajectory by changing a standby time from the reference time to time at which the light shielding member starts moving.

The control unit may determine a change amount of the moving trajectory based on information on the pupil position 102 of the imaging lens 401. The control unit may change the moving trajectory when the distance between the pupil position of the imaging lens and the light shielding member or the image sensor is shorter than a predetermined distance. On the other hand, the control unit does not change the moving trajectory when the distance is longer than the predetermined distance.

The shutter apparatus has a motor (first motor 100 or second motor 101) for driving the light shielding member. The control unit may detect the position of the light shielding member or a member connected to the light shielding member, and perform a feedback control for changing the voltage driving condition of the motor based on the difference between the position and the moving trajectory. The control unit may determine the initial value of the voltage driving condition based on the temperature, the orientation of the shutter apparatus, or the last voltage driving condition.

The light shielding member may include a first light shielding member (first blade unit 2) and a second light shielding member (second blade unit 3). The control unit may move the first light shielding member with the first moving trajectory and move the second light shielding member with the second moving trajectory during the forward exposure. The control unit may move the first light shielding member with the third moving trajectory and move the second light shielding member with the fourth moving trajectory during the return exposure. The first moving trajectory and the fourth moving trajectory may be different from each other. The second moving trajectory and the third moving trajectory may be different from each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a shutter apparatus, an imaging apparatus, a shutter apparatus control method, and a program, each of which can acquire an proper exposure amount in each of the forward exposure and the return exposure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the moving trajectory of each blade unit is a constant speed motion in the first embodiment and a constant acceleration motion in the second embodiment, but the present invention is not limited to these embodiments and is applicable to moving trajectory of another motion. In other words, the present invention may change and set the moving trajectory (standby time, speed) of the light shielding member so as to cancel the relationship of θ1>θ2>θ3 by considering the slit angle of the light shielding member from the pupil position that differs depending on the position of the image sensor as well as the moving direction of the light shielding member in each of the forward exposure and the return exposure. In other words, another embodiment may be used as long as it can compensate the difference in exposure amount in the reciprocation of the light shielding member.

Each embodiment sets the moving trajectory (second moving trajectory) of the second blade unit 3 used for the forward exposure and the moving trajectory (third third) of the first blade unit 2 used for the return exposure so that these moving trajectories are different from each other, and thereby realizes a proper exposure time on the entire surface of the image sensor. However, the present invention is not limited to this embodiment. For example, the second moving trajectory and the third moving trajectory may be set equal to each other, and the first moving trajectory used for the forward exposure and the fourth moving trajectory used for the return exposure may be set differently from each other. Thereby, a proper exposure time can be obtained on the entire surface of the image sensor. For example, the relationship of θ1>θ2>θ3 can be cancelled by changing the standby time t1 during the return exposure to t5 (<t1) during the forward exposure and changing the speed D to the speed G (<E).

In each embodiment, the focal plane shutter 113 includes two blade units of the first blade unit 2 and the second blade unit 3, but the present invention is not limited to this embodiment. The present invention is applicable, for example, to an electronic front curtain type focal plane shutter having a single blade unit.

This application claims the benefit of Japanese Patent Application No. 2018-214629, filed on Nov. 15, 2018, which is hereby incorporated by reference herein in its entirety.

What is claimed is:

1. A shutter apparatus comprising:
a shutter base plate having an opening:
a light shielding member movable to provide a closed state for closing the opening and an open state for opening the opening; and
at least one processor or circuit configured to perform operations of a control unit configured to control the light shielding member configured to reciprocate relative to the opening so as to move the light shielding member in a first direction for a forward exposure and in a second direction opposite to the first direction for a return exposure,
wherein the control unit varies an exposure correction amount of the light shielding member between the forward exposure and the return exposure.

2. The shutter apparatus according to claim 1, wherein the control unit compensates a difference in exposure amount in a reciprocation of the light shielding member.

3. The shutter apparatus according to claim 1, wherein the control unit makes different a moving trajectory between the forward exposure and the return exposure, which moving trajectory is a moving amount of the light shielding member from a reference position with time from reference time.

4. The shutter apparatus according to claim 3, wherein the control unit makes different the moving trajectory by changing a speed at which the light shielding member passes the opening.

5. The shutter apparatus according to claim 3, wherein the control unit changes different the moving trajectory by changing a standby time from the reference time to time at which the light shielding member starts moving.

6. The shutter apparatus according to claim 3, wherein the control unit determines a change amount of the moving trajectory based on information on a pupil position of an imaging lens.

7. The shutter apparatus according to claim 6, wherein the control unit changes the moving trajectory when a distance between the pupil position of the imaging lens and the light shielding member or the image sensor is shorter than a predetermined distance, and does not change the moving trajectory when the distance is longer than the predetermined distance.

8. The shutter apparatus according to claim 3, further comprising a motor configured to drive the light shielding member,
wherein the control unit detects a position of the light shielding member or a member connected to the light shielding member, and performs a feedback control to change a voltage driving condition of the motor based on the difference between the position and the moving trajectory.

9. The shutter apparatus according to claim 8, wherein the control unit determines an initial value of the voltage driving condition based on a temperature, an orientation of the shutter apparatus, or a last voltage driving condition.

10. The shutter apparatus according to claim 3, wherein the light shielding member includes a first light shielding member and a second light shielding member, and
wherein the control unit controls, during the forward exposure, the first light shielding member with a first moving trajectory and moves the second light shielding member on the second moving trajectory, and
wherein the control unit controls, during the return exposure, the first light shielding member with a third moving trajectory and moves the second light shielding member on a fourth moving trajectory.

11. The shutter apparatus according to claim 10, wherein the first moving trajectory and the fourth moving trajectory are different from each other.

12. The shutter apparatus according to claim 10, wherein the second moving trajectory and the third moving trajectory are different from each other.

13. An imaging apparatus comprising:
a shutter apparatus; and
an image sensor configured to photoelectrically convert an optical image formed through an imaging optical system,
wherein the shutter apparatus includes:
a shutter base plate having an opening;
a light shielding member movable to provide a closed state for closing the opening and an open state for opening the opening; and
at least one processor or circuit configured to perform operations of a control unit configured to control the light shielding member configured to reciprocate relative to the opening so as to move the light shielding member in a first direction for a forward exposure and in a second direction opposite to the first direction for a return exposure,
wherein the control unit varies an exposure correction amount of the light shielding member between the forward exposure and the return exposure.

14. A control method of a shutter apparatus so as to move a light shielding member in a first direction for a forward exposure, and in a second direction opposite to the first direction for a return exposure, the control method comprising the steps of:
moving the light shielding member by a first exposure correction amount during the forward exposure; and
moving the light shielding member by a second exposure correction amount different from the first exposure correction amount during the return exposure.

15. A non-transitory computer-readable storage medium storing a program for causing a computer to execute a control method of a shutter apparatus control method so as to move a light shielding member in a first direction for a forward exposure, and in a second direction opposite to the first direction for a return exposure,
wherein the control method includes the steps of:
moving the light shielding member by a first exposure correction amount during the forward exposure; and
moving the light shielding member by a second exposure correction amount different from the first exposure correction amount during the return exposure.

* * * * *